(12) United States Patent
Pimenta Ribeiro et al.

(10) Patent No.: US 11,986,737 B2
(45) Date of Patent: May 21, 2024

(54) SYSTEM AND METHOD FOR FRAUD PREVENTION IN ESPORTS

(71) Applicant: AnyBrain, S.A, Braga (PT)

(72) Inventors: André Pimenta Ribeiro, Adoufe (PT); Peter Villax, Lisbon (PT); Davide Rua Carneiro, Braga (PT)

(73) Assignee: ANYBRAIN, S.A., Braga (PT)

( * ) Notice: Subject to any disclaimer, the term of this patent is extended or adjusted under 35 U.S.C. 154(b) by 313 days.

(21) Appl. No.: 17/419,571

(22) PCT Filed: Jan. 17, 2020

(86) PCT No.: PCT/EP2020/051184
§ 371 (c)(1),
(2) Date: Jun. 29, 2021

(87) PCT Pub. No.: WO2020/148448
PCT Pub. Date: Jul. 23, 2020

(65) Prior Publication Data
US 2022/0072430 A1    Mar. 10, 2022

(30) Foreign Application Priority Data

Jan. 19, 2019  (PT) .......................... 2019000003627

(51) Int. Cl.
*A63F 13/75* (2014.01)
*A63F 13/79* (2014.01)
*G06N 20/00* (2019.01)

(52) U.S. Cl.
CPC .............. *A63F 13/75* (2014.09); *A63F 13/79* (2014.09); *G06N 20/00* (2019.01); *A63F 2300/535* (2013.01); *A63F 2300/5586* (2013.01)

(58) Field of Classification Search
None
See application file for complete search history.

(56) References Cited

U.S. PATENT DOCUMENTS

| | | |
|---|---|---|
| 7,169,050 B1 | 1/2007 | Tyler |
| 8,151,327 B2 | 4/2012 | Eisen |
| 8,360,890 B2 | 1/2013 | Tyler |
| 8,708,791 B2 | 4/2014 | Nguyen et al. |
| 8,734,238 B2 | 5/2014 | Arnone et al. |
| 9,305,028 B2 * | 4/2016 | Engineer ................ A63F 13/79 |
| 9,517,402 B1 * | 12/2016 | Vogel ................. H04L 63/1483 |
| 10,427,048 B1 * | 10/2019 | Lundquist ............ A63F 13/352 |

(Continued)

FOREIGN PATENT DOCUMENTS

| | | |
|---|---|---|
| CN | 102334140 A | 1/2012 |
| GB | 2 555 596 A | 5/2018 |

(Continued)

*Primary Examiner* — Seng H Lim
(74) *Attorney, Agent, or Firm* — 24IP Law Group USA, PLLC; Timothy R DeWitt

(57) ABSTRACT

A method and apparatus to objectively identify and classify cheating behaviors in players of virtual games, namely identity fraud or any type of software-based fraud or other unsportsmanlike or unethical behaviors. A method to use that information to inform the players, the game, the game servers, or any other external entity of the cheating behaviors found, allowing these entities to trigger disciplinary or punitive actions as per the regulations of the game or competition.

17 Claims, 8 Drawing Sheets

(56) References Cited

U.S. PATENT DOCUMENTS

| | | | |
|---|---|---|---|
| 10,905,962 B2* | 2/2021 | Kaethler | A63F 13/798 |
| 11,052,311 B2* | 7/2021 | Bleasdale-Shepherd | A63F 13/71 |
| 11,253,785 B1* | 2/2022 | Niknafs | A63F 13/335 |
| 11,727,505 B2* | 8/2023 | Cella | G06F 9/543 705/80 |
| 2004/0078572 A1 | 4/2004 | Pearson et al. | |
| 2004/0242321 A1 | 12/2004 | Overton | |
| 2007/0105624 A1 | 5/2007 | Tyler | |
| 2008/0059474 A1* | 3/2008 | Lim | G06F 16/176 707/E17.106 |
| 2008/0305869 A1* | 12/2008 | Konforty | A63F 13/77 463/29 |
| 2009/0163280 A1 | 6/2009 | Feng et al. | |
| 2010/0223656 A1* | 9/2010 | Ray | H04L 9/3271 726/2 |
| 2013/0072306 A1 | 3/2013 | Parnprome | |
| 2014/0045564 A1 | 2/2014 | Guo et al. | |
| 2017/0236370 A1* | 8/2017 | Wang | A63F 13/33 463/25 |
| 2018/0361250 A1* | 12/2018 | Brew | A63F 13/75 |
| 2019/0291008 A1* | 9/2019 | Cox | A63F 13/79 |
| 2023/0259631 A1* | 8/2023 | Zawadzki | G06N 20/00 726/22 |

FOREIGN PATENT DOCUMENTS

| | | |
|---|---|---|
| WO | 2007/109130 A2 | 9/2007 |
| WO | 2008/020710 A1 | 1/2008 |

* cited by examiner

SYSTEM AND METHOD FOR FRAUD PREVENTION IN ESPORTS

FIELD OF THE INVENTION

The present invention is in the field of fraudulent behavior in online video games, such as but not limited to competitive electronic sports.

BACKGROUND TO THE INVENTION

Such online video games are often termed "esports" and this term will be used in the description. Stakes in esports tournaments are rising, with notoriety and prizes approaching or surpassing those of many traditional sports, creating incentives for cheating. Hence, as in traditional sports, anti-fraud mechanisms need to be in place to prevent fraudulent behavior, including but not limited to cheating or other unsportsmanlike behavior. However, given the novel characteristics of esports, existing approaches are not suitable.

In Esports (Electronic Sports) athletes (gainers) compete online against each other, using computers, consoles or other apparatuses. These competitions do not necessarily take place on a stadium or physical building, and are watched by a live audience through video streaming. With the recent specialization, there are professional competitive leagues, in which players or teams or players are paid by sponsors and may receive significant prize money.

In economic terms, this is a large market, with audiences of millions of players and prize money exceeding $1 million per tournament. Global viewership is estimated at around 380 million players and revenues generated through advertising, sponsorship and media rights contribute to an $900 million market which is growing rapidly.

Such economic numbers and increasing notoriety incites players and teams to be increasingly competitive, sometimes resorting to unsportsmanlike behaviors to gain an edge over the competition. In traditional sports, the most common type of fraud is the use of athletic performance-enhancing drugs. In esports, there are novel means of performance enhancing, most of which are supported or made possible by the same electronic apparatus being used for competing. For the sake of fairness, it is imperative that this new type of sports be controlled as traditional sports are, to prevent these behaviors. However, existing approaches are not suited as esports have very distinct features.

There are several different types of cheating in esports, which can be summarized in two main groups: software assisted cheating and unsporting play.

1) Software assisted cheating includes methods that use specific software in the apparatus of the player to artificially improve a certain skill relevant to the performance of the player in the game.

Aimbot is a method that relies on the information received by the player's apparatus about the opponents' locations. While this information is necessary for the game to render the visualization of all its elements, it can also be exploited by special software to artificially and continuously target a given opponent in a way so precise that it would be impossible for a human player to accomplish. This can even be performed when the opponent is behind an obstacle (such as a wall), allowing the player to fire as soon as the opponent becomes visible since the aiming reticule of the player is always on-target.

Tiggerbot is a method to automatically fire when an opponent appears within the player's aiming reticule. This leads the player to exhibit reaction times that would be impossible to a human player. This method is commonly used with the previous one, to achieve a method that constantly tracks an opponent and immediately fires, greatly improving the performance of the player.

Artificial lag is a method that relies on slowing or temporarily interrupting the data stream between the player and the server. The main goal of this method is to make the player's avatar to behave erratically and in unpredictable ways (e.g. the avatar appears to be teleporting between two points instead of moving linearly). The player is thus able to tamper the player's outgoing information stream, while still receiving the opponents' data with the necessary quality. This gives the player advantages over the opponents. This method can be implemented either through software or through hardware.

Look-ahead is a method in which the player gains an advantage over the opponents by delaying her/his own actions so that the opponents' actions can be analyzed before announcing their own actions. This is achieved through a special software that tampers the outgoing data packages by attaching a timestamp that is prior to the actual one, thus misleading the server into believing that the package was sent at the correct time but delayed during transport.

Scripting is a technique that allows the cheating player to automate certain tasks, or to perform them with unnatural velocity, artificially increasing the player's performance. These techniques are generally implemented using specific software or by exploiting features of the game (e.g. assigning the fire action to the scroll of the mouse to fire at much faster rates). One such example is the automatic reloading of a gun when certain conditions are met. Another common application of scripting is Rapid fire, described below.

Rapid fire modifications are methods that rely on the modification of the peripherals (e.g. controller, mouse, keyboard) that the cheating player uses to play. These modifications can be performed through hardware or software, and allow the player to fire or perform other in-game actions at a much higher rate, creating an advantage over the opponents.

Unsporting play include approaches that do not necessarily rely on specific software or hardware, but rather on unethical behaviors of the player.

Boosting, or stat-padding, is a method through which a player will use multiple accounts and play one against the other, with the main goal to boost (i.e. significantly improve) the player's standing in tournament rankings and league tables to allow participation in more valuable competitions and get more sponsorship money. This can also be carried out by multiple players, in which one or several players agree to allow the cheating player to win, allowing her/him to artificially improve their personal best number of points.

Character sharing is a method through which multiple people take turns playing as the same character. This gives the character an advantage over other characters as it will be online significantly more time, allowing the collection of more resources, the gaining of more points, and/or the faster evolution of its skills/equipment.

Twinking is the action of one player transferring gear/equipment of high-level characters to lower-level characters, that the latter would normally not be able to afford/acquire. The higher stats of this equipment give the lower-level character an unfair advantage over the remaining characters of its rank. This transfer may occur between characters of the same player or between accounts of different players and may involve real money being exchanged in return.

Ghosting is a method through which a player observes the gameplay of a given opponent using a secondary playing apparatus (e.g. computer, console) and account. The cheating player exploits a mechanism that exists in most online games, that allows people to spectate games. When the player has more than one playing apparatus and account in the same physical location, she/he can use the additional apparatuses to spectate the opponent, thus gaining valuable information (e.g. opponents' location, opponents' weapons) in an unfair way.

Those methods of software-assisted cheating described above can generally be implemented in three different ways: 1) game code modification, 2) system software modification and 3) packet tampering.

Cheating methods can be implemented by modifications of the software code of the game. Although game vendors distribute only binary versions of the games (i.e. machine executable versions in which the human-readable source code is not available) there are reverse engineering techniques that reveal parts or all of the source code, and allow its posterior edition. Alternatively, cheating players may also alter the data files associated with the game in order to gain unfair advantages or more advantageous playing conditions. Asides from constituting an unsportsmanlike behavior, this method is also strictly forbidden by the end-player license agreement of games.

Cheating methods can also be implemented through system software modifications. In these methods, it is not the game that is changed but rather components of the system in which the game runs (e.g. modification of graphics drivers). These methods may be used, for instance, to draw all game objects on the screen despite the existence of obstacles, allowing the cheating player to see an opponent which should not be visible under the current conditions.

Finally, some cheating methods can be implemented through packet interception, tampering and/or manipulation. This is a type of man-in-the-middle attack, and allows the cheating player to intercept and eventually change incoming/outgoing data packages so as to gain an advantage over the opponents (e.g. artificially changing location or player actions).

Esports cheating is therefore very diverse and is estimated to be widespread, and can only be opposed using methods that monitor the cheating at the source, in real time. While blood tests are effective in controlling drug doping in traditional sports, in esports post-facto detection is largely inefficient at neutralizing the ill-gotten gains and a different approach is required.

This application therefore proposes a method and apparatus to prevent and detect unsportsmanlike behaviors in esports that can be used continuously and in real-time, namely during, but not limited to, professional competitions.

To accomplish this, the proposed method takes advantage of one aspect that the cheating methods presented before have in common: they alter the way the player behaves in-game. That is, from the point of view of an external observer, the cheating player behaves in unnatural or non-human ways. Sometimes, these changes are significant or evident enough to be detected by a human observer. However, there are techniques that are more subtle and harder to detect, especially for untrained players. The proposed technique uses Big Data and statistics to automate detection and make it precise, reliable and scalable.

The use of the proposed method in esports, namely in professional competitions, can significantly increase the fairness, transparency and credibility of the whole process. This will consequently increase the willingness of sponsors and brands to participate and be associated to esports teams and players, thus contributing to the sustained and ethical evolution of the industry.

PRIOR ART

The background analysis carried out shows that cheating methods in esports can be very diverse, both in their implementation method and goals. Some methods and apparatus to prevent or detect fraud in esports have already been put forward, although in a limited number or with very limited application. This may explain the lack of use of such methods in esports competitions Currently, there are two main types of fraud detection mechanisms known. The first type of fraud detection mechanism is based on an analysis of the memory of the gaming apparatus, and checking for code changes in the memory that may be caused by an external agent, such as a cheating software running simultaneously on the same apparatus. The second type of fraud detection mechanism looks at specific in-game data and relies on specific game actions (e.g. movement patterns, aiming and firing patterns) to determine if these game actions are humanly possible or likely.

K. D. (in Chinese Patent Nr. CN102334140B) describes a method for preventing fraud in esports. The proposed method relies on a certification authority that certifies the hardware and software present in a given gaming apparatus, at a given moment, including operating system or device drivers. This same certification authority must then also certify that any changes that are performed on the system (such as updating graphics drivers or upgrading hardware) are also certified. For instance, that the drivers being used have not been changed or that the code of the game being used by the player is the original code. The main goal of this invention is to prevent cheating through system modifications.

A similar approach is proposed by Pearson et al. (US 2004/0078572 A1), although only at the software level. This approach first verifies the authenticity of the relevant software code, such as the BIOS and the operating system, to ensure that the player is running the game within a compartment on a trusted computing platform and that no other software component is present in that compartment that can alter the interaction with the game. If the system passes this first audit, the method then verifies the identity of the gaming application, to ensure that the original software code has not been changed, for example by applying a patch or some other unauthorized modification to the game. These verifications may include checks for signatures of known patches, checks made on the names of routines used within the game, and checks on the lengths, and/or check sums of some of the application software components. Depending on the implementation of the game, the software components may include executable files, binary files, library files or applets. Pearsons et al. also propose to use a monitoring agent for monitoring a player's performance, running on the participants computing device. The monitoring agent may advantageously monitor the game play in order to determine that rules of causality are obeyed and/or that response times are not unbelievably fast. They do not, however, clarify how this agent would access this relevant game-specific information.

Eisen (U.S. Pat. No. 8,151,327B2) proposes a method for addressing packet tampering cheating, and more specifically, man-in-the-middle attacks. The approach collects a plurality of device fingerprints that are associated with the player's session identifier. By collecting these device fingerprints and session information at several locations among the content delivered by the server throughout an online session, the method proposed can identify session tampering, namely when contents are accessed from different IP addresses in a same session. The proposed method is generic and could be applied in any domain in which there is the concept of online session, which includes esports.

Overton (US 2004/0242321 A1) proposes an approach to the detection of cheating that uses two instances of the game running on two separate machines, in which one monitors the other. Specifically, game instances monitor the actions of the other characters, pointing out actions that are outside the capabilities of the game application (e.g. performing a jump with a distance larger than the maximum permitted by the game). The method proposed points out cheaters to the gaming system so that she/he can be removed from the gaming environment. The document also does not clarify how the method would have access to the rules of the game, or how it could be adapted to each different game given that each game has its own rules.

Guo et al. (US 2014/0045564 A1) propose a method for anti-cheating for online games, especially designed for projectile-launching turn-based war games. The key idea of the method is to send the information of each projectile launch to the server, so that it is the server that computes the trajectory of the projectile. The server then sends this trajectory back to the player client, that has only to plot it on the screen. The goal is thus to move all game logic from an untrusty client to a certified server. This method, however, only applies to this very specific type of game. Moreover, the author does not clarify how to protect from man-in-the-middle attacks, that could tamper the packets received/sent from/to the server, thus gaining advantage over the opponent.

There is also a wide range of methods for anti-cheating specific to online betting and gaming oriented to casinos, including U.S. Pat. No. 8,708,791B2, US20090163280A1, U.S. Pat. No. 8,734,238B2 or US20130072306A1. These methods are nonetheless too specific to the types of games used by casinos and cannot be generalized to be used in the types of games that are played in esports (e.g. RPG, FPS).

Other methods or systems can be found that are similar or related to the previously described ones, including U.S. Pat. No. 7,169,050B1, U.S. Pat. No. 8,360,890B2 or US 2007/0105624 A1. Here, A) each method targets only one specific type of cheating (e.g. software tampering, communications tampering); or B) There are methods that rely on specific information from the game, but do not clarify how this information would be obtained or how the method could be adapted to different games.

In U.S. Pat. No. 9,517,402 B1 a method for player identification is proposed that relies on a player profile and a so-called player behavior model. The player profile includes many variate data such as age, gender, residence and current location, job, income, lifestyle, credit card transactions, among many others. The player behavioral model is built based on game-specific data, that is, the game-specific data is developed and implemented individually per game. Example variables in the game-specific data include target acquisition patterns, time from on-screen to reaction, part(s) of body being targeted, fire pattern, time between bursts, among others. Moreover, the variables proposed by the authors are very specific to FPS (frames per second)-type games, leaving aside many other different and equally popular games such as role-playing games (RPGs).

Both US 20080305869 A1 and WO 2007/109130 A2 address the issue of cheating by observing the way the apparatus in use by the player is being used. Specifically, both the patent applications 'US'869 and WO'130 look at elements such as data stores access patterns, file operations (e.g. reading, writing, opening), CPU usage, paging file, network activity and resources utilization, among others.

SUMMARY OF THE INVENTION

Therefore, this document teaches a novel method and apparatus for preventing and detecting different types of fraud. The method and apparatus is different from existing approaches in the sense that:
  it does not require specific in-game information. Thus, the method and apparatus is not limited to a specific game type and does not need to be adapted for each different game type.
  it does not rely on the acquisition of personal and sensitive information such as location, gender, credit card transactions, or social networks information, to establish the profile of the player.
  it does not monitor hardware/software activities nor network activities/resources, in order to not run the risk of interfering with the apparatus's performance and thus damaging player performance.

The method and apparatus works by considering solely the player's interaction with the apparatus' input hardware, including but not limited to hardware such as keyboard, joystick or controller (e.g. writing speed, key typing latency, mouse pointer velocity and acceleration).

Detection of cheating is achieved by constantly monitoring player interaction and using statistical tools to identify patterns that are non-human or significantly differ from the player's known profile. In that sense, and opposed to existing approaches, this approach is generic in the sense that it can be used with any gaming apparatus or any game, without the need to individual and specific adaptations. nor on hardware and the detection of cheating is independent of the game and its context.

Moreover, unlike the prior art solutions, the method and apparatus can detect unsportsmanlike behaviors, such as a player of greater skill taking the place of the original player. This type of behavior does not alter the software of the game in memory, nor does the replacement of the player alter the way the computational resources are being used. However, the replacement of the player does alter the dynamics of the player's interaction with the peripherals of the gaming apparatus. The real-time monitoring of these dynamics allows detection of such cases, aside from other types of fraud or cheating that result in a significant change in playing dynamics.

This document describes a system and method for detecting esports cheating or fraud and to determine whether one or more players in an online game are cheating and/or behaving fraudulently at a given moment. This detection is carried out independently of the type of game (or game context). The system comprises at least one personal computing device, which can be a personal computer, or a laptop, or a portable device, or a game console, or any computing device used for playing a computer game. When running a computer game on the personal computing device connected to a central server, the personal computing device may also be known as a client. The system also includes a central server which may or may not be the same server of the game and multiple clients which are the players' own computing devices where their instances of the game are running. The central server includes a server memory for storing data as will be described below. The client is connected to the server via a communications network, such as the internet.

In addition to regular game-specific data, the client(s) running the games send to the central server interaction data describing the interaction events of the player with the input peripherals of the device (e.g. mouse, keyboard, controller). This data may be collected by an external application installed on the client and running simultaneously with the game being monitored, or by the game itself using an available SDK (Software Development Kit) that may be integrated by game publishers. The interaction data sent to the central server describes generic interaction events with the input peripherals of the device during gameplay, such as but not limited to mouse clicks or keys typed and their specific timestamps, coordinates, duration and other characteristics.

The central server receives the interaction data from the player and processes the interaction data to generate relevant and meaningful interaction features. These interaction features are very diverse and relate to the peripheral(s) being used by the player (e.g. keyboard, mouse, joystick). The interaction data will have generally been compressed in order to reduce the amount of resources required in the network for the transfer of the interaction data. Contrary to existing approaches, the generated interaction features describe the dynamics of the player's interaction with the input peripherals during the game. The interaction features are not the in-game actions of the player (which would be game dependent). In that sense, these generated interaction features are independent of the game being played in any given moment. These interaction features include features such as mouse velocity, mouse acceleration, click latency, keyboard latency, and will also include any other features that describes how the player is using the input peripherals.

The processed data from the different players and from multiple gaming sessions is continuously transmitted to and saved in the server memory of the central server. When enough data is stored in the server memory of the central server, two different types of interaction profiles are built. 1) A general interaction profile describes how any player generally interacts with the input peripheral(s) of the gaming apparatus while playing this specific game. 2) A specific interaction profile describes how one specific player interacts with the peripheral(s) of the gaming apparatus while playing this specific game. Thus, and as opposed to the teachings of U.S. Pat. No. 9,517,402 B1 and similar works described in the prior art, the method and apparatus of this document does not use the generation of a unique player identifier based on personal/sensitive data. Rather, this method and apparatus builds statistical interaction profiles that describe players' interaction dynamics with the input peripherals of the gaming apparatus. These are meaningful artifacts in this domain, that allow to formalize: 1) general interaction dynamics; 2) individual interaction dynamics; and detect 3) statistically significant deviations from the accepted normal behavior that may indicate some type of fraud or cheating.

These two interaction profiles, taken either alone or in combination with each other, act as a digital signature of the esports player and can therefore be used to confirm the identity of the esports player and general interaction patterns with the gaming apparatus, and consequently identify cheating or fraudulent behaviors, including spotting impostors or detecting illegal performance-enhancing devices.

Both types of the interaction profile are built in a similar fashion: for each interaction feature, the central server calculates the so-called "normal interval". This normal interval, represented by its maximum and minimum value, represents the boundaries that frame the player's (or group of players') usual behavior concerning each of the interaction features. For instance, for most players, the latency of each key press on the keyboard is generally between 55 ms and 90 ms (but this value is not limiting of the invention).

The conjunction of all the intervals for all the interaction features with one or more of the input peripherals of a given player (or group of players) of which there are multiple dimensions, as many as the various interaction features tracked for each player, constitutes the so-called "interaction profile". This interaction profile of each player and of any desired group of players (such as a registered team or all players of a game) is saved in the server memory of the central server.

The central server constantly monitors the interaction features of the players playing the game, comparing the monitored interaction features against the interaction profiles stored in the server memory. If the behavior of one player differs significantly from their interaction profile, that player is marked by the server as a cheater (or fraud). The server may then implement one or more actions such as record the event, notify the client, terminate the connection with the client, or apply any disciplinary measures such as temporary or permanent bans, removing in-gaming resources from the player's avatar, highlighting the position of the player's avatar, impairing the player's avatar (e.g. slowing down movement), among others.

As an example scenario, if a given player generally has an average mouse click frequency between 2 to 5 seconds and their interaction features start to include clicks occurring at an average rate of 0.2 seconds, this will be identified as a cheating behavior.

The combined use of all the interaction features described further below in the present document allows for the creation of very detailed and unique interaction profiles, in the sense that each player has a very different interaction pattern with the input peripheral(s) of the gaming apparatus. This allows the use of this method for the detection of different types of fraud or cheating, namely methods that artificially enhance the game performance of the player or instances where the player is substituted by another of greater ability and skill, to improve its standing or to gain any other type of advantage. This kind of cheating or fraud cannot be detected by existing methods or systems as described in the prior art.

This document that teaches a computer-implemented method for detection of fraudulent behavior of a player in an online video game. The method comprises collecting at a personal computer device a plurality of interaction data relating to a plurality of interactions of the player with a plurality of peripheral devices connected to the personal computer device and transmitting the interaction data to a central computer server. A comparison is performed at the central server between the transmitted interaction data and a player interaction profile stored in a player interaction database to identify a risk of fraudulent behavior based on the comparison between the transmitted interaction data and the stored player interaction profile. The central computer server issues a message indicative of the risk of fraudulent behavior. The method does not require any interaction with the online video game and restricts the collection of the interaction data to the interaction data generated by the peripherals. Thus, there is no interaction with the operation of the online video game which could affect the manner in which the online video game operates.

The player interaction profile used for the comparison is derived from at least one of a statistically based normal interval level or a model derived from machine learning and comprises a general player interaction profile and one or more specific player interaction profiles. In general, each of the players will have a specific player interaction profile. As explained below, the general player interaction profile can be initially used to make the comparison and, as a new player begins to play the online video game more often, the interaction data from the new player is used to develop the new player's own specific interaction profile. The normal interval level is between a maximum usual movement distance and a minimum usual movement distance and wherein the comparison to identify the risk of fraudulent behavior is determined by comparing one of more of the movement distances to determine whether they fall within the normal interval level. The use of a statistical or machine learning model means that the amount of interaction data generated by the peripherals and sent for storage and comparison by the central computer server is restricted, which reduces the load on the resources and accelerates the processing.

The interaction data comprises, but is not limited to, at least one of reaction times between the player and one or more of the peripheral devices, movement distances of a movable one of the peripheral devices moved by the player, velocity of movement of the movable one of the peripheral devices, or force applied to one or more of the peripheral devices. This interaction data is generated independently of the online video game, or indeed the type of online video game.

The method can be used to verify an identity of one of the players by comparing the transmitted interaction data from a specific one of the players with one or more of the specific player interaction profiles. The method can also be adapted to update the stored player interaction profile based on the received interaction data.

The method is used to detect, for example, the fraudulent behavior comprises at least one of engaging additional software tools, taking performance-enhancing drugs, or swapping player profiles.

A system for detection of fraudulent behavior of a player in an online video game is also disclosed in this document. The system comprises a central computer server connected over a network to one or more personal computer devices and the one or more personal computer devices are connected to a plurality of peripheral devices. The system also includes a player interaction database storing a plurality of player interaction profiles. The central computer server is adapted to receive interaction data from the plurality of peripheral devices and identify a risk of fraudulent behavior based on a comparison between the received interaction data and the stored player interaction profile.

The peripheral devices include, but are not limited to, one or more of a mouse, a keyboard, a joystick, motion detector, or an eye-tracking device.

In a further aspect, a method of generation of a player interaction profile is disclosed in this document. The method comprises collecting at a personal computer device a plurality of interaction data relating to a plurality of interactions of the player(s) with a plurality of peripheral devices connected to the personal computer device and transmitting the interaction data to a central computer server. The interaction data is analyzed using one of statistical or machine learning methods to produce the player interaction profile.

Logic instructions for performing the methods are stored on at least one non-transitory machine-readable storage medium, such as an internal memory, a cloud memory or a connected data service

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

The terms "fraud", "fraudulent", "cheat" and "cheating" are used alternatively and interchangeably in this document to describe the same type of behavior which is not compliant with the honest playing of the game and can also be determined "unsportsmanlike".

Figure 1:
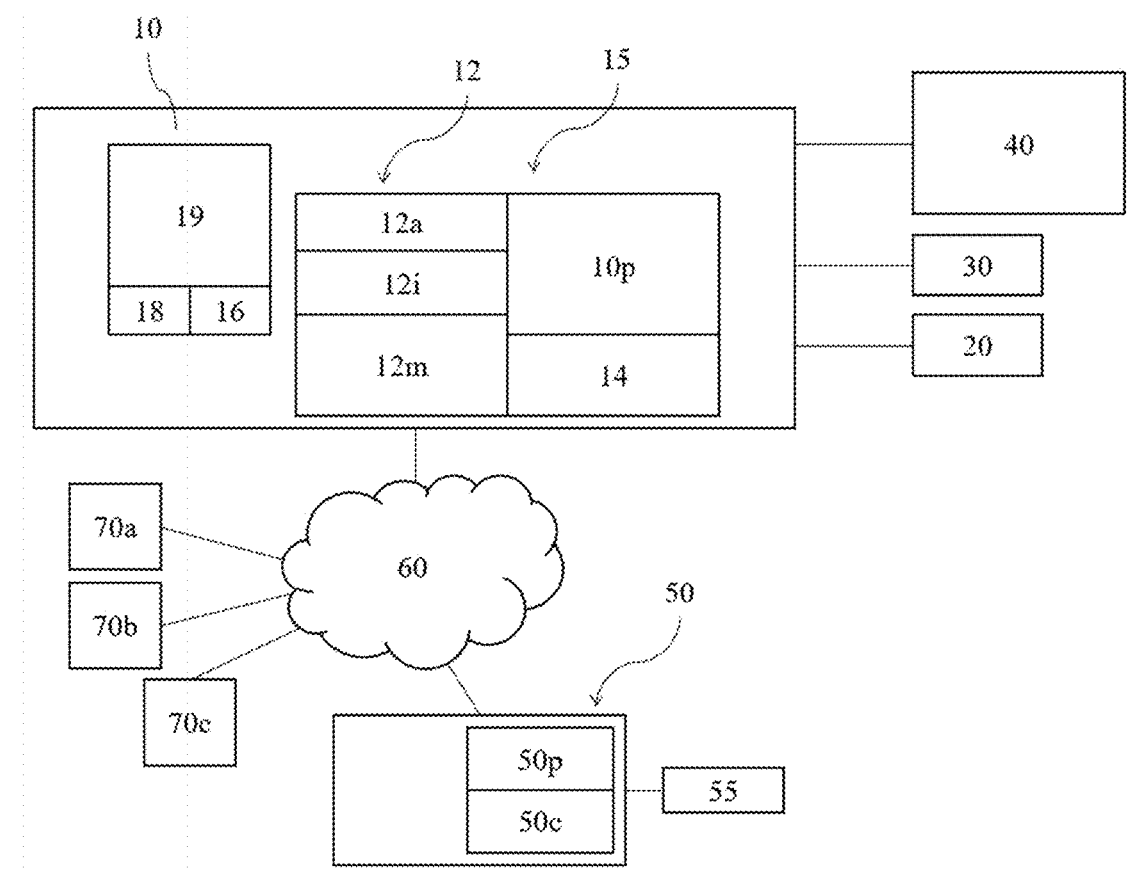
FIG. 1 shows an overview of the system.

The apparatus of the present document is shown in FIG. 1 and comprises a personal computing device 10, connected to a pointer device 20, a keyboard 30, and a display unit 40.

The pointer device 20 and the keyboard 30 are collectively termed "input peripherals". The term "input peripherals" includes other types of devices not shown here.

The personal computing device 10 has a processing system 10p and a storage device or local memory 15. The personal computing device 10 is executing in its processing system 10p a specific data collection software 12 that collects interaction data 12d and, optionally, an online video or computer game 14 that is being played. The data collection software 12 and the computer game 14 are stored in the memory 15. The personal computing device 10 is further connected a central computer server 50 through a network 60. The central computer server 50 has a network storage area 55. Further computers 70a-c may also be connected to the personal computing device 10 or to the central computer server 60.

The data storage device or local memory 15 may include a machine-accessible non-transitory medium on which is stored one or more sets of software program instructions embodying any one or more of the methodologies or functions described herein. The software may also reside, completely or at least partially, within the local memory 15 and/or within the processor 10p during execution thereof by the computer system 10, the local memory 15 and the processor 10p also constituting machine-accessible storage media. The software may further be transmitted or received over the network 60 via the network interface or communications subsystem.

The machine-accessible non-transitory medium may also be used to store data structure sets that define player interaction profiles. Data structure sets and interaction profiles may also be stored in other sections of computer system 10, such as static memory.

While the machine-accessible non-transitory medium is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present invention. The term "machine-accessible non-transitory medium" shall accordingly be taken to include, but not be limited to, solid-state memories, optical and magnetic media, and carrier wave signals.

The pointer device 20 includes any input peripheral device connected to the personal computing device 10, cabled or wireless, or detectable by a computer, which can transmit instructions from the player as to where a pointer or other indicator should be on a screen of the display unit 40 and receive instructions from the player to select the area of the screen covered by the pointer or other indicator. The term "pointer device" includes, but is not limited to, a mouse, a joystick, a touchpad, a trackball, a stylus, the player's eyes or fingers or any other sensing, pointing or tracking device with the function of placing a pointer in a given location in the display unit 40 or in any unit giving pointer location information to the player. Additionally, pointer devices may have mechanical or other types of buttons, switches or touch-sensitive areas which the player can click, tap, press or actuate to launch a programmed action over the selected area of the computer screen or display unit. Throughout this application, the terms "pointer" and "mouse" may be used interchangeably and they both refer to the term "pointer" defined above.

The keyboard 30 includes any input device connected to a computer, cabled or wireless, or detectable by a computer, which comprise keys representing letters, numbers, symbols and function keys and which are selectable by the player and transmitted to the computer and optionally to the display unit of the computer. The keyboards can be mechanical, touch-sensitive and/or virtual, as in a touch-screen computer tablets or in any other device not invented yet but fulfilling the same function of keyboards, to the exclusion of voice commands, which are not covered by the present invention.

The data collection application 12 comprises a real-time monitoring system 12m running in the background (i.e. removed from the player's view) of the player's personal computing device 10, which collects the interaction data 12d about the interaction events of the player with the personal computing device 10 using the aforementioned input peripherals 20 and 30. While the data collection application 12 may collect the interaction data from the interaction with any device, input peripheral, or application running in the personal computing device 10, the goal is to collect the interaction data 12d from the player's interaction dynamics with the input peripheral(s) 20 and 30 whilst the player is using the input peripherals. This real-time monitoring system 12m is divided into three distinct components as will now be set out.

Collection of the input from player's interaction with the input peripheral(s) of the personal computing device 10. This real-time monitoring system 12m of the data collection software 12 is continuously running in the background, while the player interacts with the personal computing device 10 and the input peripherals 20 and 30 while the computer game application 14 is running in the foreground. The monitoring part 12m of the data collection software 12 collects the interaction data 12d regarding the events resulting from the use of or general interaction with the peripherals, such as the mouse and keyboard devices 20 and 30; When a player is interacting with the personal computing device 10 the player needs to apply a set of cognitive skills in the player's mind to be able to process the information that is received from the personal computing device 10. This received information includes sound, video or images on the display unit 40. The interaction with the personal computing device 10 usually is a result of a set of interactions as a result of a commands given to the personal computing device 10 (in a passive or active way);

One or more application programming interfaces (API) 12a to process the inputs from the input peripherals 20, 30 (this is a set of services hosted in a server that calculate top level information describing player interaction, also called interaction features) or the processing of inputs in the machine itself. As will be explained below, the amount of interaction data 12d collected is reduced by using compression algorithms.

Presentation panel of cheating monitoring results 12i, which presents the interaction data 12d collected and processed from the player, as well as the results of the cheating monitoring; Optionally, this component may also trigger punitive actions such as temporarily banning the player from the session.

The computer game application 14 is any game that the player is running and playing on the personal computing device 10 and which requires movements of the input peripherals, such as the mouse 20 or the keyboard 30 for its operation. The computer game application 14 is an online video game, such as a competitive esports game, but also could be other types of games, such as role-playing games.

The central server 50 is any computer networked with the player's personal computing device 10 and which stores the players' interaction profiles and may be required to do some additional processing. The central server 50 is divided into two distinct components:

A profile building module 50p which continuously receives the interaction data 12d from the player and builds and updates the player's interaction profile, using statistical tools. This interaction profile represents the way in which a player generally interacts with the input peripherals 20 and 30. Moreover, this profile building module 50p also builds interaction profiles of groups of players (e.g. teams or all players of a game), for example using the further computers 70a-c. The interaction profiles are stored in a player interaction profile database 55p.

A cheating detection module 50c that, given the interaction data 12d of one player, determines if the interaction data 12d represents or indicates a cheating/fraudulent behavior or not. This cheating detection module 50c uses statistical tools, Machine Learning, Artificial Intelligence and/or other approaches to analyze the interaction data against the player's known interaction profile. Optionally, when the interaction data 12d is classified as representing cheating, this cheating detection module 50c may communicate with the information panel 12i of the player's personal computing device 10 to inform the player, so that the computer game application 14 can be informed about the unsporting behavior of the player. Other external modules (e.g. game servers) may also receive information from this cheating detection module 50c.

In use, the apparatus and method of the present application analyze the dynamics of the player's interaction with the input peripheral(s) 20, 30 of the personal computing device 10 being used as the gaming apparatus, which translate into game actions. The proposed apparatus and method thus consider the input peripherals, such as the pointer device 20 or the keyboard 30 and interpret their dynamics/movements. It will be appreciated that at this stage a large amount of data will be collected. Some of this data will be repetitive and can be compressed using a string compression algorithm, such as run length encoding.

The apparatus and method reduce the amount of interaction data 12d that needs to be saved by converting these pointer and keyboard dynamics into a normalized group of numbers (the interaction features) indicative of the player's interaction patterns.

The apparatus and method then compare the player's interaction pattern to those of the same player or of other internet-connected players (interaction profiles) using the same apparatus and method for further precision. The apparatus and method may then trigger an intervention within the computer game application 14 (or other software) to adapt or regulate its function to the player's interaction pattern, or to a command system external to the personal computing device to trigger further actions to inform or warn the player, another application (e.g. game server) or a supervisor (e.g. judge in a competition) about the suspected cheating or fraudulent behavior. It is not necessary for the intervention to happen in real time. It would be possible to reduce the use of resources for the intervention to only happen at periodic intervals, e.g. every day or every week or at the end of a competition.

Figure 2:
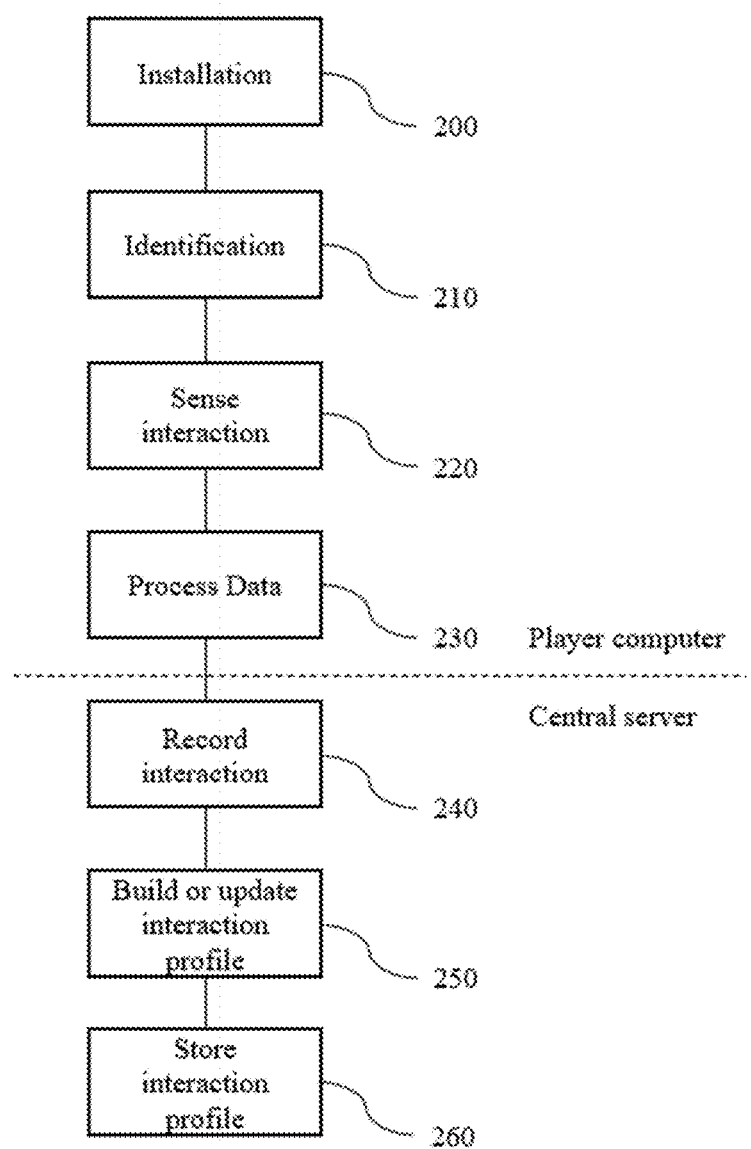
FIG. 2 shows an overview of the process of building an interaction profile.
Figure 3:
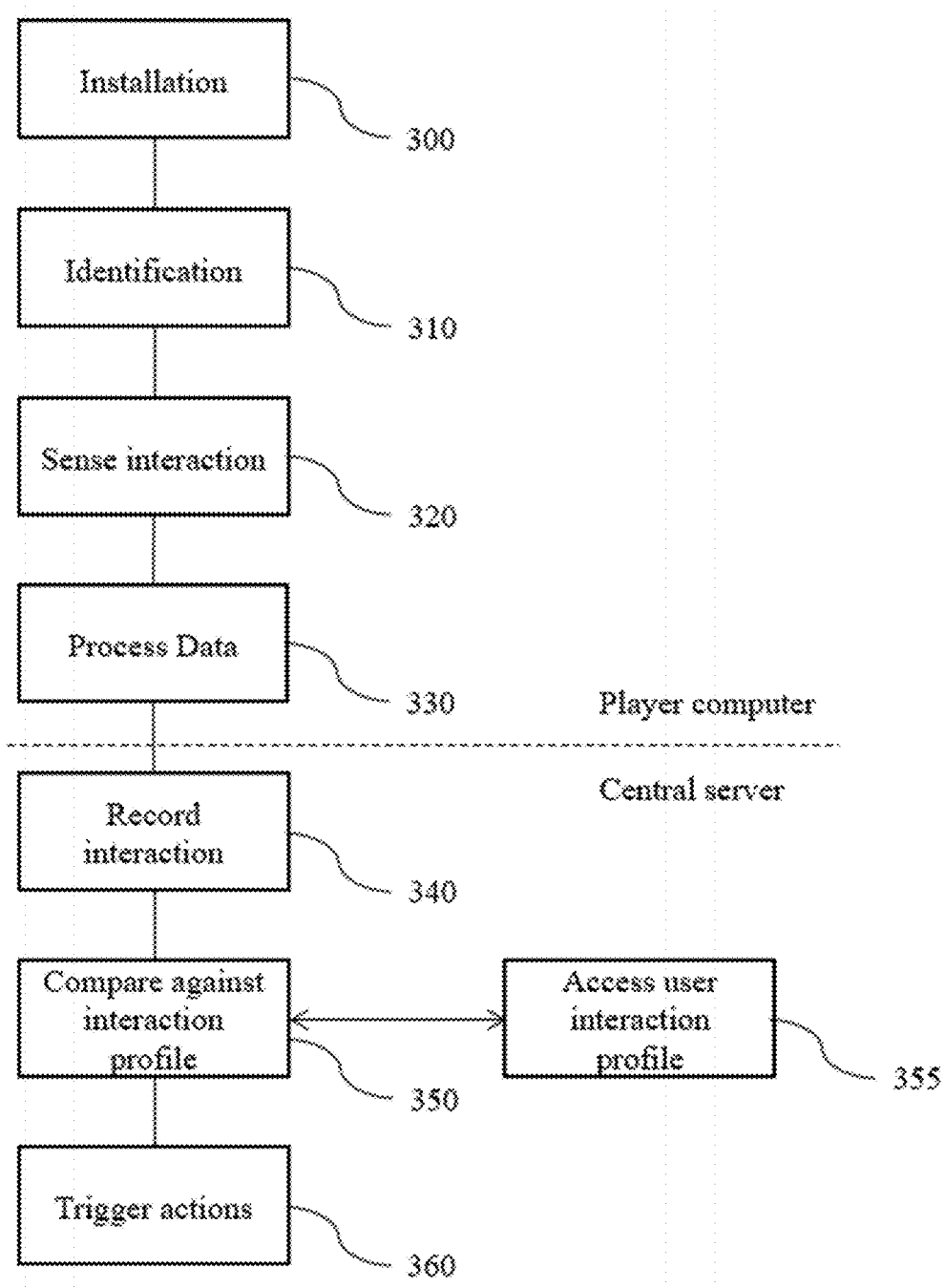
FIG. 3 shows an overview of the process of classifying the interaction data of one specific player as cheating or not cheating.
Figure 4:
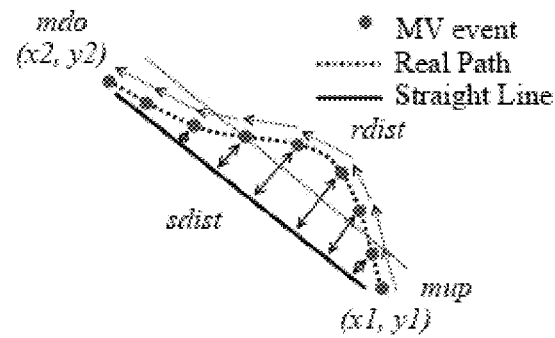
FIG. 4 shows the calculation of the features Distance and Average Distance of the Mouse to the Straight Line.

In terms of data flow, two main processes can be identified: the first process is for building and updating players' interaction profiles (detailed in FIG. 2) and the second process is for detecting and classifying cheating behaviors (detailed in FIG. 3). These processes are described here:

FIG. 2 describes, step by step, the process through which individual or group interaction profiles are built. The player installs the data collection software 12 (step 200) in her/his personal computing device 10. Alternatively, the game publisher integrates an SDK that contains the necessary functionality in the computer game application 14. The player provides authentication information (step 210) to identify herself/himself in the system, i.e. on the personal computing device 10 and/or the central computer server 50. The data collection software 12, as noted above, continuously captures the interaction events from the player's interaction with the input peripherals 10 and 30 (step 220). The interaction data 12d captured includes relevant information such as a timestamp (in ticks or milliseconds) or coordinates of the pointer on the screen of the display device 40. The following are non-limiting examples of the interaction events that can be captured and tracked, although any other interaction event with any input peripheral can be used:

MOV, an event describing the movement of the mouse 20, at a given time, to coordinates (posX, posY) in the screen of the display device 40;

MOUSE_DOWN, [Left|Right],—this event describes the first half of a click (when the mouse button is pressed down), at a given time. It also describes which of the buttons was pressed (left or right) and the position of the mouse 20 in that instant;

MOUSE_UP, [Left|Right],—an event similar to the previous one but describing the second part of the click, when the mouse button is released;

MOUSE_WHEEL,—this event describes a mouse wheel scroll of amount, at a given time;

KEY_DOWN,—identifies a given key from the keyboard 30 being pressed down, at a given time;

KEY_UP—describes the release of a given key from the keyboard 30, at a given time.

An excerpt and example of the collected data is presented below. In this excerpt, the player moves the mouse 20 (first two lines) from the coordinates (451, 195) to (451, 197), then performs the first half of a click with the left button (third line) in coordinates (451, 199), then moves the mouse 20 a bit to coordinates (452, 200) (fourth line), then ends the click by releasing the button in the same coordinates and finally keeps moving the mouse 20 to coordinates (454, 205). All this takes place between timestamps 635296941683402953 and 635296941685803193:

MOV, 635296941683402953, 451, 195
MOV, 635296941684123025, 451, 197
MOUSE_DOWN, 635296941684443057, Left, 451, 199
MOV, 635296941685273140, 452,200
MOUSE_UP, 635296941685283141, Left, 452, 200
MOV, 635296941685723185, 452, 203
MOV, 635296941685803193, 454, 205

Some of the above interaction events are for a conventional mouse 20. In the case of a touch pad, which does not have any moving parts, certain tracked events would be different (e.g. pressing force would be one of the different tracked events). It will be appreciated that the person skilled in the art would have no problem in identifying these different tracked interaction events and adjusting the data collection software 12 to make use of the new types of interaction events to track. The same would apply to a joystick, stylus or to any other type of pointer device.

These six categories of the interaction events produce the interaction data 12d while the player is playing the computer game application 14 running in the foreground. In step 230 these data are processed to generate the so-called interaction features, which are a group of high-level variables that thoroughly describe the interaction of the player with the input peripherals 20, 30. The following list contains examples of interaction features that could be produced by the data collection software 12 while the player is interacting simultaneously with the mouse 20 and the keyboard 30. The proposed apparatus and method is however not limited to these interaction features and includes any other features interaction that describes the dynamics of a player interacting with any input peripheral of the personal computing device 10 being used as the gaming apparatus, while playing any computer game application 14.

Time spent between the key down and key up (or key release) events;

Time spent between different keys on the keyboard 30;

Acceleration in pressing a key on the keyboard 30;

Velocity in pressing a key on the keyboard 30;

Number of times the backspace key is pressed, versus the keys pressed;

Velocity at which the cursor travels;

Acceleration of the pointer at a given time;

The duration of each pointer click;

A measure of the number of clicks on active controls versus the number of clicks in passive areas;

Excess of distance travelled by the pointer between a pair of two consecutive clicks;

Average of the excess distance travelled by the pointer between a pair of two consecutive clicks;

Speed of the double click;

Number of double clicks in a time frame;

Distance travelled by the pointer while dragging objects;

How much the pointer "turned" left or right during its travel;

Measures, absolutely, how much the pointer "turned" during its travel;

Measures the distance between all the points of the path travelled by the mouse between each two consecutive clicks, and the closest point in a straight line (that represents the shortest path) between the coordinates of the two clicks;

Same as above, but provides an average value of the distance to the straight line.

The above-mentioned interaction features are calculated at regular intervals by the data collection software 12. For the sake of clarity, we shall now describe the process for computing the most complex interaction features proposed, in order to detail their relevance and meaning in the context of interaction dynamics and fraud detection.

In the case of Distance of the Mouse to the Straight Line (DMSL), this feature measures the sum of distance of the mouse to the straight line defined between two consecutive clicks. Let us assume two consecutive MOUSE_UP and MOUSE_DOWN events, mup and mdo, respectively in the coordinates $(x_1, y1)$ and $(x_2, y_2)$. Let us also assume two vectors posx and posy, of size n, holding the coordinates of the consecutive MOUSE_MOV events between mup and mdo. The sum of the distances between each position and the straight line defined by the points $(x_1, y1)$ and $(x_2, Y_2)$ is given by equation 1 below, in which ptLineDist returns the distance between the specified point and the closest point on the infinitely-extended line defined by $(x_1, y_1)$ and $(x_2, y_2)$.

$$s_{dists} = \sum_{i=0}^{n-1} ptLinedist(posx_i, posy_i),\qquad \text{(Eqn 1)}$$

Another interaction feature generated by the data collection software 12 is mouse velocity. This is the distance travelled by the mouse 20 (in pixels) over the time (in milliseconds). The velocity is computed for each interval defined by two consecutive MOUSE_UP and MOUSE_DOWN events. Let us assume two consecutive MOUSE_UP and MOUSE_DOWN events, mup and mdo, respectively in the coordinates $(x_1, y1)$ and $(x_2, Y2)$, that took place respectively in the instants $time_1$ and $time_2$. Let us also assume two vectors $pos_x$ and $pos_y$, of size n, holding the coordinates of the consecutive MOUSE_MOV events between mup and mdo. The velocity between the two clicks is given by $$\frac{r_{dist}}{(time_2 - time_1)},$$

in which $r_{dist}$ represents the distance travelled by the mouse and is given by equation 2:

$$r_{dist} = \sum_{i=0}^{n-1} \sqrt{(posx_{i+1} - posx_i)^2 + (posy_{i+1} - posy_i)^2} \qquad \text{(Eqn. 2)}$$

Figure 5:
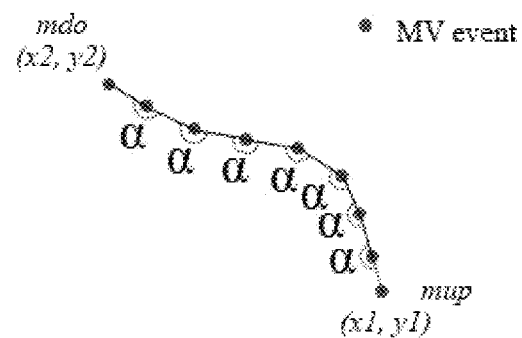
FIG. 5 shows the calculation of the features Signed and Absolute Sum of Angles
Figure 6:
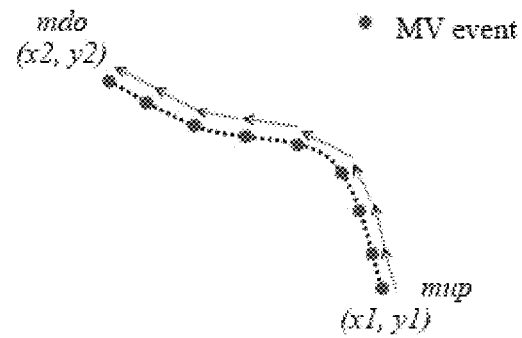
FIG. 6 shows the calculation of the Real Distance traveled by the mouse between two clicks.

One last example of interaction feature described here is the absolute sum of angles. This feature seeks to find how much the mouse 20 "turned", independently of the direction to which the mouse 20 turned (FIG. 5). In that sense, the interaction feature is computed as the absolute of the value returned by function degree(x1, y1, x2, y2, x3, y3), as depicted in equation 3.

An efficient mouse movement is characterized by lines of movement that are almost straight. Therefore, higher values of this feature indicate a less efficient movement of the mouse.

$$s_{angle} = \sum_{i=0}^{n-2} \text{degree}(posx_i; posy_i; posx_{i+1}; posy_{i+1}; posx_{i+2}; posy_{i+2}) \qquad \text{(Eqn. 3)}$$

An example will also show how the logs of the keyboard data are transformed into keyboard-related interaction features, like key down time, time between keys, etc. Consider the following snippet of pseudocode:

Data: Keyboard Inputs

Result: List of KeyDownTime records while Keyboard Inputs have records do

Get timestamp of a KEY_DOWN:

Get code of KEY_DOWN:

while Keyboard Inputs have records do

Get timestamp of KEY_UP:

Get code of KEY_UP:

if KEY_DOWN code and KEY_UP code are the same then Save the difference between KEY_UP timestamp and KEY_DOWN timestamp;

end end end

Algorithm 1: Key down time algorithm

This pseudocode determines the amount of down time of the key on the keyboard 30, i.e. how long the key is pressed (also known as typing latency). Similar code can be used to determine values of other interaction features and, given its relative simplicity, will not be detailed here.

An example of processed data will serve to better describe the type of information generated by this process. The data presented below describes all the interaction features calculated for a given player (Player X) at a given moment in time.
{
"TimeStamp": NumberLong(1506373243375),
"Player": "Player X",
"Performance": {
"TimeStamp": 1506373242732,
"KDTVar": 1033.9388571428572,
"KDTMean": 125.5952380952381,
"MAMean": 0.5366564446226314,
"MAVar": 0.36105299630493787,
"MVMean": 0.4912874973741709,
"MVVar": 0.29093708004098856,
"TBCMean": 9089.82142857143,
"TBCVar": 152705577.48544973,
"DDCMean": 21.252471533256006,
"DDCVar": 1111.4930124743523,
"DMSLean": 18972550.8,
"DMSLVar": 664834398497875.0,
"AEDMean": 3.0064312681905263,
"AEDVar": 6.020307987912261,
"ADMSLMean": 184632.7142857143,
"ADMSLVar": 65030255404.582,
"TBKVar": 18145.18881118881,
"TBKMean": 147.36363636363637,
"LeftClicks": 29.0,
"RightClicks": 0.0,
"KeysPressed": 88.0,
"WVMean": 28.333333333333332,
"MouseDistance": 7.833947450529339,
"MouseExcessDistance": 1.2101157953969313,
"MousePrecision": 78.52464254995121,
"ErrorPerKey": 22.727272727272727
}}

The processed interaction data 12*d* is then sent to the central computer server 50, which records it locally in its network storage are 55 (step 240). Thus, the interaction data 12*d* about each player continuously grows as each player plays the computer game application 14.

When a sufficient amount of the interaction data 12*d* about a given player with the peripheral devices 20, 30 is available, the system proceeds to build an interaction profile of said player (step 250). Several different approaches can be used to build the interaction profile, including but not limited to: A) Statistics and B) Artificial intelligence techniques such as machine learning algorithms:

A) The player interaction profile can be built using statistical tools using the following method. The player interaction profile is constituted by two limit values (lower and upper) for each of the interaction features described above. These limits are computed using a statistical approach and, in their conjunction, represent the "normal" interaction dynamics of one player or group of players being considered (e.g. team, top-tier players). The meaning of the "normal" interaction dynamics can be understood by the following example concerning the mouse moving velocity: Player X generally moves the mouse at a speed between 0.02 px/ms and 0.34 px/ms. When these limits are calculated for all of the interaction features, a unique interaction profile is obtained for each of the individual players. Thus, this unique interaction profile can be used not only to find statistically significant deviations from the "normal" behavior of one player but also to identify when a player is behaving in an entirely different way (such as when another player is using the first player's character).

The following method is applied to compute these limits. For each player, all of the available interaction data is considered. For each interaction feature, the Inter-Quartile Range (IQR) is calculated. For each interaction feature, the first and third quantiles are calculated (Q1 and Q3, respectively). The upper limit of an interaction feature f is obtained by Eqn4. The lower limit of an interaction feature f is obtained by Eqn5. Together, these two limits establish the boundaries of the "normal" behavior of a given player.

$$ULim_f = Q3_f + 1.5 * IQR_f \quad (4)$$

$$LLim_f = Q1_f - 1.5 * IQR_f \quad \text{(Eqn. 5)}$$

The statistical player interaction profiles are saved in a table-like format, in the player interaction profile database 55*p* connected to the central computer server 50 (step 260).

Among other data such as identifying information, the interaction profile contains two values for each interaction feature (upper and lower limits).

Figure 7:
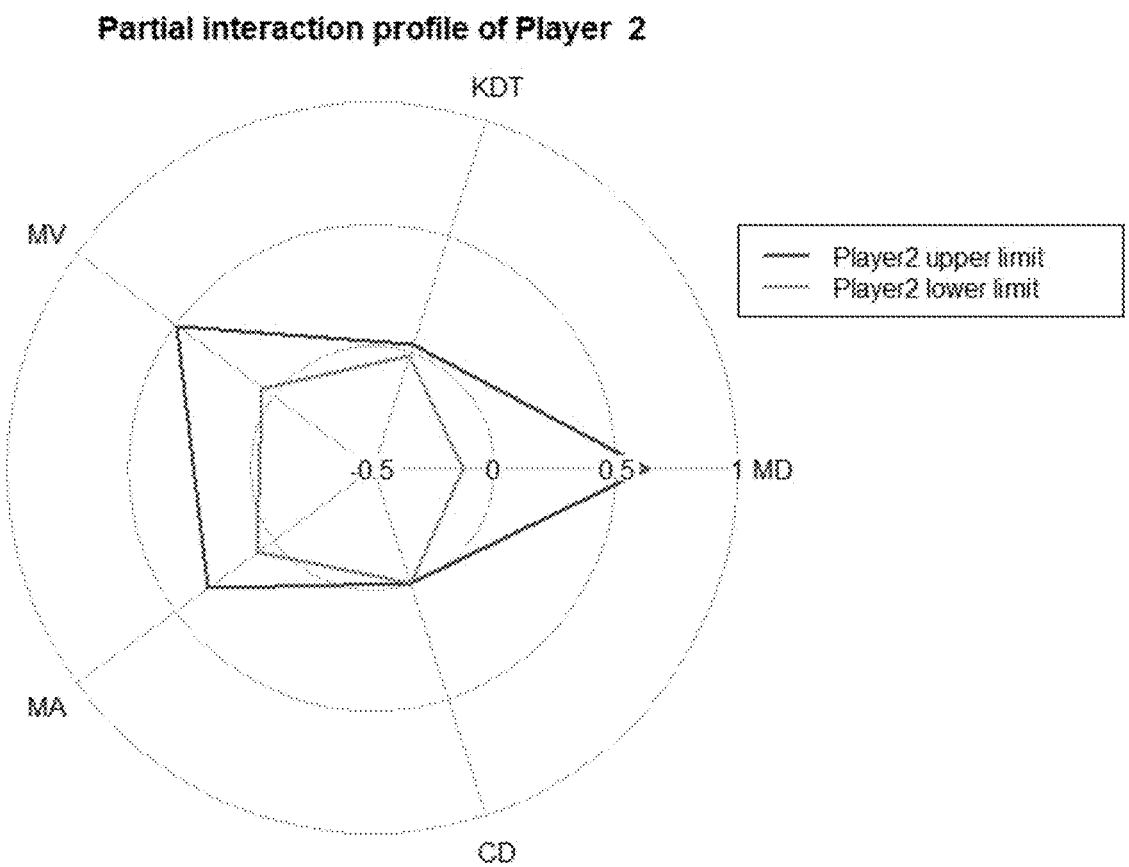
FIG. 7 shows part of the interaction profile of one player (Player2), depicted graphically.

FIG. 7 visually depicts a simplification of the interaction profile of one player (identified as Player 2). For the sake of readability, only five interaction features are depicted. The two lines show the lower and upper limits of these variables.

Figures 10, 11:
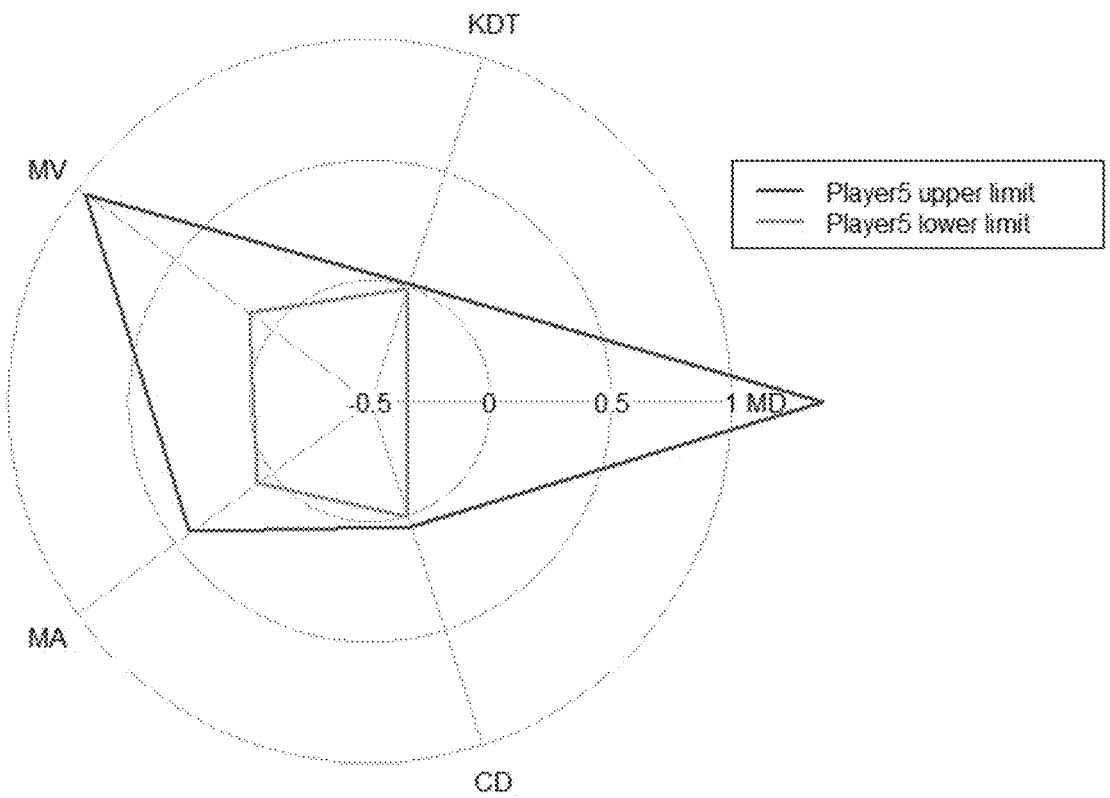
FIG. 10 shows part of the interaction profile of one player (Player5), depicted graphically.
FIG. 11 shows a confusion matrix generated after the use of the system for identity classification.

FIG. 10 shows a similar visualization but for the interaction data of another player (identified as Player 5): the differences in the shapes of both visualizations are evident and result from different interaction patterns of both players. The interaction profiles are so different that they can be used to identify the player, as described further below. It will be appreciated at this stage that neither of the interaction profiles contain "personal" data B) Alternatively, an approach based on artificial intelligence techniques such as, but not limited to, machine learning, can be followed to create the player's interaction profile.

Following this approach, artificial intelligence algorithms are trained to distinguish between what is considered a normal and an abnormal behavior for the players. To this end, a method similar to A) is employed. However, the upper and lower limits defined are now used to automatically label each instance of data from a given player as being normal or not. This results in a dataset with a categorical variable ("normal"/"abnormal") that can be used to train binomial classification or regression models.

These models, once trained, can be used to attribute a class ("normal"/"abnormal"), and/or a number that depicts the certainty level, to a new instance of data and thus determine if the new instance of data may or may not represent a cheating behavior (including, if defined, the certainty level). An example of this learning algorithm is the nearest neighbor's algorithm see (https://en.wikipedia.org/wiki/K-nearest_neighbors algorithm).

Another method is by creating functions of approximation values as in the case of artificial neural networks (https://en.wikipedia.org/wiki/Artificial_neural_network), or through any other algorithm capable of recognizing patterns. These machine learning algorithms enable the interpretation of a large amount of data in a reduced space of time for substantially real-time monitoring.

Let us now describe the second of the two most relevant processes proposed in this application, as detailed in FIG. 3. The main goal of this process is to determine if a given player is or is not cheating, at any computer game application being played at any given moment. This process executes regularly after the first successful conclusion of the process described in FIG. 2, i.e., after there is an interaction profile for the player stored in the player interaction profile database 55p of the central computer server 55.

The first five steps are similar to those of the previously described process: the player installs the data collection software 12 in the personal computing system 10 if the data collection software 12 is not already installed (step 300) or if the computer game application 14 does not integrate the SDK. The player provides the identifying information so that she/he can be recognized in the system (step 310), the data collection software 12 starts collecting the interaction data 12d from the player while playing (step 320), the interaction data 12d is processed so that the interaction features previously described are generated and sent to the central server (step 330) and the interaction features are stored in the network storage area 55 of the central computer server 50 (step 340).

The next step (step 350) is the one to determine if the interaction data of the player with the peripheral devices 20, 30 received from the personal computing device 10 represents or not a cheating or fraudulent behavior. This step is different depending on the way in which the interaction profile was built. Below, for the sake of clarity, we shall detail the process for the two methods previously addressed: A) Statistical Tools or B) Artificial Intelligence. However, other similar processes may be defined and can be included in this method and apparatus, which are adaptations according to the way the interaction profile was built.

A) To accomplish this task using a statistical interaction profile, the central computer server 50 first retrieves the corresponding player interaction profile from the player interaction profile database 55p. Then, for each interaction feature, the central computer server 50 verifies if the value of the received data falls within the limits of the feature in the player profile. The central computer server 50 thus computes the percentage of the interaction features that fall within the limits defined in the player interaction profile. A high percentage indicates that the player is not cheating as she/he is interacting in a normal way. A lower percentage indicates that the player is behaving abnormally according to the known player interaction profile and might be cheating.

Figure 8:
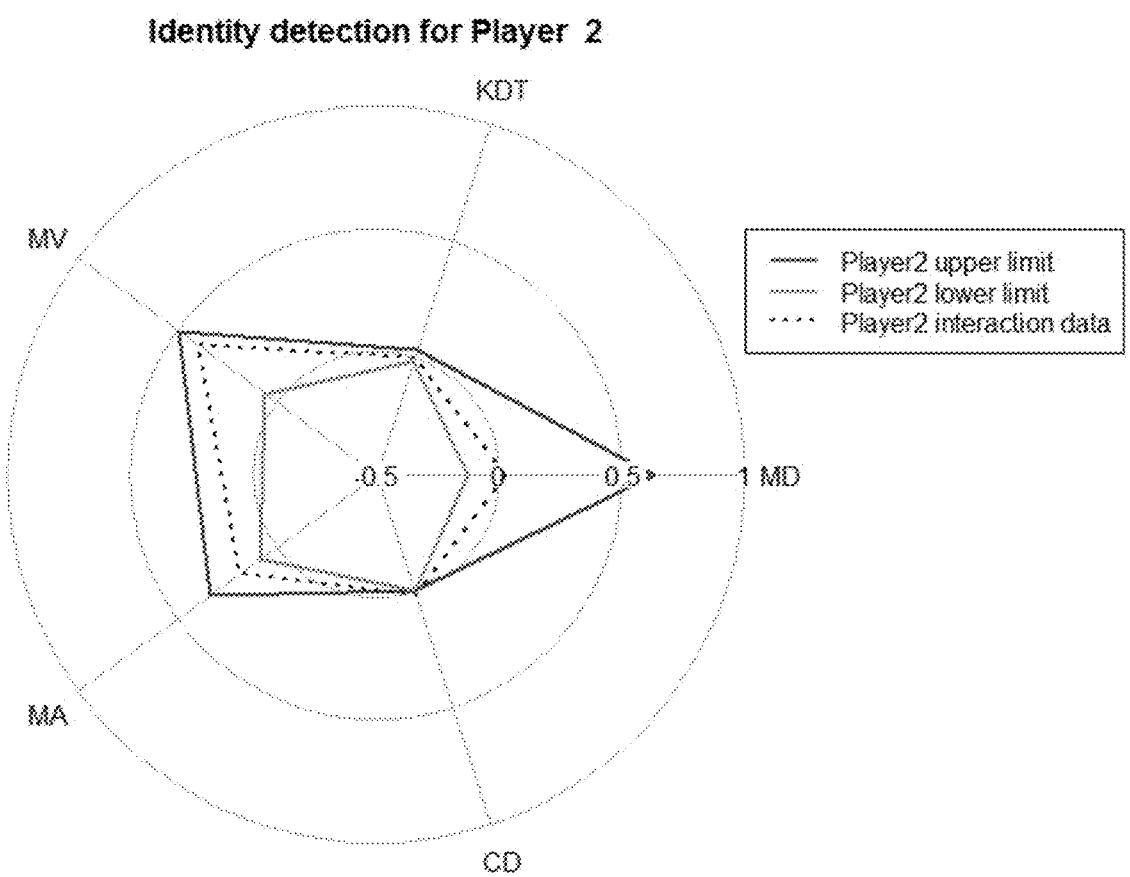
FIG. 8 shows part of the interaction profile of one player (Player2), depicted graphically, as well as one instance of interaction data from the same player.

FIG. 8 depicts this graphically. For the sake of readability, the figure represents graphically part of the profile of Player 2 (upper and lower limits of five interaction features shown with the solid lines). The figure also represents one set of data being checked for cheating (dashed line) of the same player. In this example, all the interaction features are within the limits of the player interaction profile, which indicates that the identity of the player is correct and that she/he is not cheating. In this scenario, the central computer server 55 provides as a result the value 100%, which indicates that the interaction of the player matches the known player interaction profile.

Figure 9:
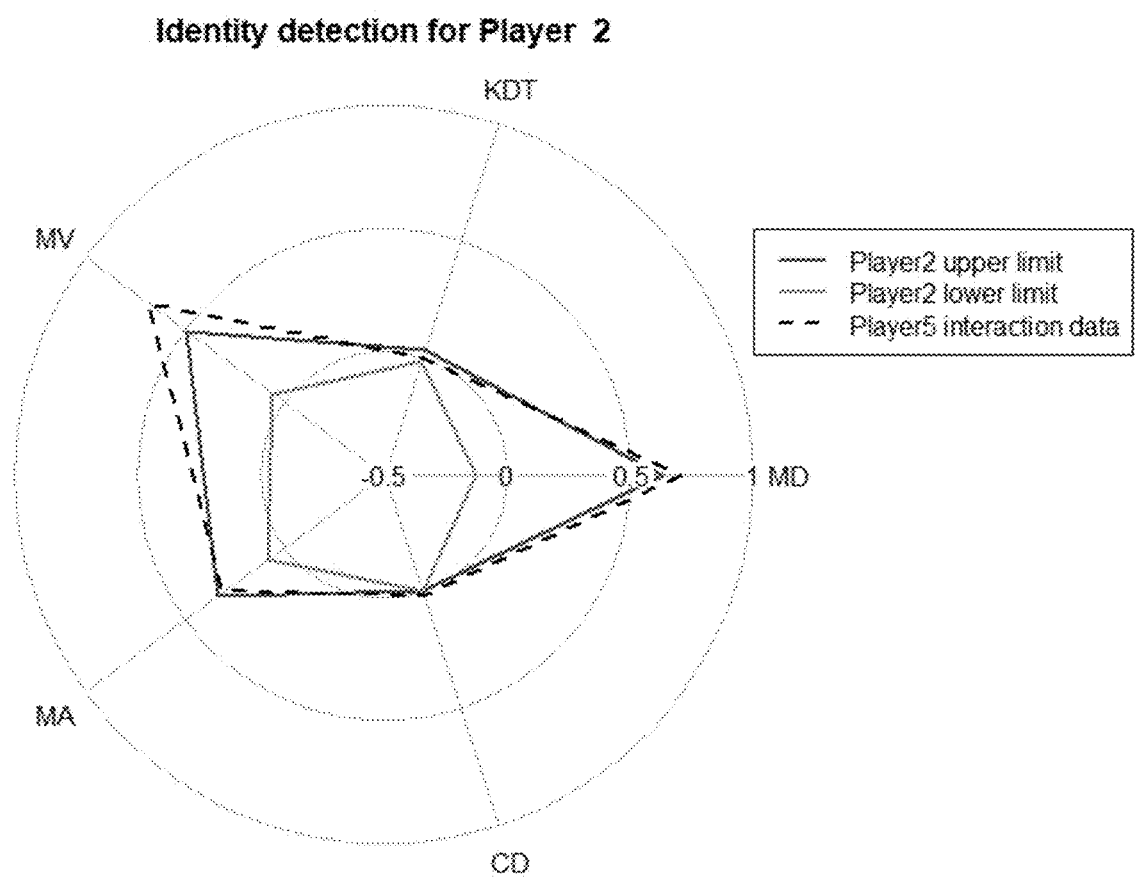
FIG. 9 shows part of the interaction profile of one player (Player2), depicted graphically, as well as one instance of interaction data from another player (Player 5).

FIG. 9, on the other hand, shows an instance of data that does not comply with the interaction profile. Specifically, three of the interaction features (MV, MD and CD) are outside the limits of the player interaction profile, which results in the central computer server 50 returning the value 40%. This indicates either that the player is cheating or that another player is playing with the registered player's character. In this example, the second case happens since data from a different player was used to exemplify the concept.

It needs to be pointed out, once again, that this is only a simplified version of the process that considers only five interaction features for facilitating the visualization of the process. The invention proposed in this application considers many other features when building the player interaction profile and when checking for unsportsmanlike behaviors, not limited to those that were detailed in this application for the sake of clarity.

B) To accomplish this task using models obtained through artificial intelligence algorithms, the process is more straightforward as these models can be executed and, given an unlabeled instance of data, will provide in return a label for that data. In this case, the central computer server 50 retrieves the corresponding artificial intelligence model that was stored in the network storage area 55 and obtains a classification label ("normal"/"abnormal") and/or a number that depicts the certainty level on the prediction, and that characterizes the instance of data being analyzed.

Finally, in step 360, certain actions can be triggered according to the result of the fraud prediction. Namely, the central computer server 50 may implement one or more actions such as record the event, notify the client, terminate the connection with the client, or apply any disciplinary measures such as temporary or permanent bans, removing in-gaming resources from the player's avatar, highlighting the position of the player's avatar, impairing the player's avatar (e.g. slowing down movement), among others.

A second use of this invention would be to continuously inform the game server about cheating behaviors of the players or teams, so that the game server may take additional punitive actions such as temporarily or permanently banning the player as per the game rules.

A third use of this invention would be to prevent and detect cheating behaviors during online esports competitions in which the players and the judges participate remotely, from different geographical locations. In this case, the system could inform the judges about any suspected cheating behavior observed in any of the players so that disciplinary measures could be taken as per the regulation.

A fourth use of this invention would be to prevent and detect cheating behaviors during esports competitions in which the players and the judges are in the same geographical location, as when esports competitions are held in a stadium or similar building. In this scenario, the system could inform the judges about any suspected cheating behavior so that the software/hardware being used by the player could be further inspected and so that any disciplinary measures could be taken as per the regulations.

A fifth use of this invention would be to maintain an online list of the players that were found to cheat while playing a given computer game application. This list could be updated automatically and, optionally, include the penalty or disciplinary action applied in each case. Such a list would have a deterrent effect on the cheating behavior of other players.

All of these uses of the proposed system can be combined without limitation and signals and triggers originating in the central server can be any of those identified above, to cause any desired action in the main software applications, in the playing environment or in informing the player, judge or other supervisor.

The method of the present invention uses the above described apparatus and method to objectively detect cheating behaviors as it records, analyzes and compares player actions and behaviors using a pointer and a keyboard, performed during normal gameplay, which it then uses to signal or trigger preset actions in the main software application or in the game itself, changes to the game environment or relaying of information to the player, judge or other supervisor.

EXAMPLE

Here it is described a use of the invention for the purpose of player identification.

The apparatus was implemented as previously described, using one computer acting as a central server (containing all the aforementioned components) and five computers acting as clients.

Five different professional players played several instances of a given game while the data collection software 12 was active in their personal computing devices used as the gaming computers.

In total, 9309 instances of data were collected from each of the players. In this case, and given that each instance of data contains the averaged values of the last five minutes, the data considered represents more than 700 hours of interaction.

Using this data, a protocol to evaluate the ability of the method and apparatus to identify each of the players was tested and validated. In order to ensure the validity of the findings, data were divided in two groups: train and validation.

The training dataset contains approximately 75% of the data, selected randomly, and was used to create the player interaction models following a statistical approach, as described previously. This resulted in the creation of five player interaction profiles (one for each player), each containing 39 variables: one that identifies the player and two for each of the interaction features described previously (the upper and lower limits, determined following the statistical approach described).

The validation dataset contains the remaining 25% of the data and was used to assess the classification accuracy of the invention when it comes to identify the correct player.

The methodology followed for assessing the accuracy of the invention was as follows. For each instance of the validation dataset, it was calculated the percentage of interaction features that complied with the interaction profile of each player. Thus, for each interaction instance, the central server returned the likeliness of those data belonging to each of the five players.

Next, the player with the highest likeliness was selected to be the prediction result. This prediction result was then compared against the actual player (which in this case is known). The count of correct vs. wrong predictions gives us the percentage of correctly classified players.

FIG. 11 depicts the confusion matrix created after the use of this system to identify each player using the trained models on the validation dataset.

It will be appreciated that the present invention is being submitted as a provisional patent application and within the priority year the definitive application shall be submitted, complying with the appropriate technical and legal requirement and proper correspondence between the content of the specification and the individual claims. We believe however, that the inventive case is made and is fully disclosed here, and will be properly written in the definitive application, together with the appropriate dependent claims and correct drawing reference.

REFERENCE NUMERALS

10 Personal computing device
10p Processing system
12 Data collection software
12a Application programming interfaces
12i Intervention module
12m Real-time monitoring system
14 Computer game application
15 Memory
16 Database
18 Internal table
20 Pointer device
30 Keyboard
40 Display unit
50 Central computer server
50c Cheating classification module
50p Profile building module
55 Network storage area
55p Player interaction profile database
60 Network
70a-c Further computers

The invention claimed is:

1. A computer-implemented method for detection of fraudulent behavior of a player in an online video game, wherein the fraudulent behavior is one of replacement of the player by another player or the use of performance-enhancing software or hardware by the player the method comprising:
   collecting at a personal computer device a plurality of interaction data relating to a plurality of interactions of the player with a plurality of peripheral devices connected to the personal computer device;
   transmitting the interaction data to a central computer server;
   performing at the central computer server a comparison between the transmitted interaction data and a general player interaction profile stored in a player interaction database;
   performing at the central computer server a comparison between the transmitted interaction data and one or more specific player interaction profiles stored in the player interaction database to verify an identity of one of the player and the another player;
   identifying a risk of fraudulent behavior based on the comparison between the transmitted interaction data and the stored player interaction profile as well as one or more specific player interaction profiles; and
   receiving from the central computer server a message indicative of the risk of fraudulent behavior, wherein
   at least one of the general player interaction profile or the one or more specific player interaction profile is derived from at least one of a statistically based normal interval level or a model derived from machine learning;
   the interaction data comprises movement distances of a movable one of the peripheral devices moved by the player; and
   the normal interval level is between a maximum usual movement distance and a minimum usual movement distance and wherein the comparison to identify the risk of fraudulent behavior is determined by comparing one of more of the movement distances to determine whether they fall within the normal interval level.

2. The method of claim 1, wherein the interaction data comprises at least one of reaction times between the player and one or more of the peripheral devices, velocity of movement of the movable one of the peripheral devices, or force applied to one or more of the peripheral devices.

3. The method of claim 2, wherein the normal interval level is between a maximum usual reaction time with one or more of the peripheral devices and a minimum usual reaction time with one or more of the peripheral devices and wherein the comparison to identify the risk of fraudulent behavior is determined by comparing one of more of the reaction times to determine whether they fall within the normal interval level.

4. The method of claim 1, further comprising continuously updating the player interaction profile based on the transmitted interaction data.

5. The method of claim 1, further comprising an updating of the stored general player interaction profile and the one or more specific player interaction profile based on the received interaction data.

6. The method of claim 1 wherein the fraudulent behavior comprises at least one of engaging additional software tools, taking performance-enhancing drugs, or swapping player profiles.

7. The method of claim 1, further comprising triggering preset actions based on the message indicative of the risk of fraudulent behavior.

8. The method of claim 1, wherein the interaction data captures an interaction event of the player with the plurality of peripherals devices, wherein the interaction event is at least one of:
   an event describing a movement of a mouse at a given time;
   an event describing a mouse click, a pointer click or a press of a given key from a keyboard, at a given time;
   an event describing a release of the given key from the keyboard, at a given time;
   an event describing a first half, or a second half of the mouse click at a given time;
   an event describing a press of at least one of mouse buttons;
   an event describing coordinates of the mouse at a given time;
   an event describing a mouse wheel scroll of amount at a given time.

9. The method of claim 1, further comprising processing the interaction data to generate a plurality of interaction features, where the plurality of interaction features is at least one of:
   coordinates of a pointer on a screen of a display device;
   a timestamp of a mouse click or a press of a given key from a keyboard;
   a time spent between a press or release of the given key or different keys from the keyboard;
   an acceleration or a velocity in pressing the given key on the keyboard;
   a number of times a backspace key is pressed, versus keys pressed;
   a velocity at which a cursor travels;
   an acceleration of the pointer at a given time;
   a duration of a pointer click, a mouse click or the press of the given key from the keyboard;
   a number of clicks on active controls versus a number of clicks in passive areas;
   an excess or an average of distance travelled by the pointer between a pair of two consecutive clicks of the given keys;
   a speed of a double click;
   a number of the double clicks in a time frame;
   a distance travelled by the pointer while dragging objects.

10. A system for detection of fraudulent behavior of a player in an online video game, wherein the fraudulent behavior is one of replacement of the player by another player or the use of performance-enhancing software or hardware by the player, the system comprising:
   a central computer server connected over a network to one or more personal computer devices, the one or more personal computer devices being connected to a plurality of peripheral devices;
   a player interaction database storing a plurality of player interaction profiles; wherein the stored player interaction profiles comprise a general player interaction profile and one or more specific player interaction profiles; and
   the central computer server is adapted to receive interaction data from the plurality of peripheral devices and identify a risk of fraudulent behavior based on a comparison between the received interaction data and the stored general player interaction profile, wherein
   at least one of the general player interaction profile or the one or more specific player interaction profile is derived from at least one of a statistically based normal interval level or a model derived from machine learning;
   the interaction data comprises movement distances of a movable one of the peripheral devices (20,30) moved by the player; and
   the normal interval level is between a maximum usual movement distance and a minimum usual movement distance and wherein the comparison to identify the risk of fraudulent behavior is determined by comparing one of more of the movement distances to determine whether they fall within the normal interval level.

11. The system of claim 10, wherein the plurality of peripheral devices comprises one or more of a mouse, a keyboard, a joystick, motion detector, or an eye-tracking device.

12. The system of claim 10, wherein the interaction data comprises at least one of reaction times between the player and one or more of the peripheral devices, velocity of movement of the movable one of the peripheral devices, or force applied to one or more of the peripheral devices.

13. The system of claim 10, wherein the central computer server is adapted to create one or more of the player interaction profiles based on the interaction data.

14. The system of claim 10, further comprising a messaging system to generate a message indicative of the risk of fraudulent behavior.

15. The system of claim 10, wherein the interaction data captures an interaction event of the player with the plurality of peripherals devices, wherein the interaction event is at least one of:
   an event describing a movement of a mouse at a given time;
   an event describing a mouse click, a pointer click or a press of a given key from a keyboard, at a given time;
   an event describing a release of the given key from the keyboard, at a given time;
   an event describing a first half, or a second half of the mouse click at a given time;
   an event describing which of mouse buttons was pressed;
   an event describing coordinates of the mouse at a given time;
   an event describing a mouse wheel scroll of amount at a given time.

16. At least one non-transitory machine-readable storage medium having logic instructions stored thereon, the logic instructions when executed by a central server processor cause the central server processor to:
   receive from a personal computer device a plurality of interaction data relating to a plurality of interactions of the player with a plurality of peripheral devices connected to the personal computer device;

to perform at the central computer server a comparison between the transmitted interaction data and a general player interaction profile as well as one or more specific player interaction profiles stored in a player interaction database; and identify a risk of fraudulent behavior based on the comparison between the transmitted interaction data and the stored player interaction profile, wherein the fraudulent behavior is one of replacement of the player by an impostor or the use of performance-enhancing software or hardware by the player, wherein at least one of the general player interaction profile or the one or more specific player interaction profile is derived from at least one of a statistically based normal interval level or a model derived from machine learning, the interaction data comprises movement distances of a movable one of the peripheral devices moved by the player; and the normal interval level is between a maximum usual movement distance and a minimum usual movement distance and wherein the comparison to identify the risk of fraudulent behavior is determined by comparing one of more of the movement distances to determine whether they fall within the normal interval level.

17. The storage medium of claim 16, further comprising logic instruction to cause the central computer server to issue a message indicative of the risk of fraudulent behavior.

* * * * *